United States Patent [19]

Kosuga

[11] 4,301,219

[45] Nov. 17, 1981

[54] ELECTRIC STORAGE CELL OR BATTERY

[76] Inventor: Jiro Kosuga, 1-9-9-106, Sendagaya, Shibuya-Ku, Tokyo-To, Japan

[21] Appl. No.: 70,693

[22] Filed: Aug. 28, 1979

Related U.S. Application Data

[63] Continuation of Ser. No. 905,365, May 11, 1978, abandoned.

[30] Foreign Application Priority Data

May 13, 1977 [JP] Japan .................................. 52-54840

[51] Int. Cl.³ ............................................ H01M 10/06
[52] U.S. Cl. ...................................... 429/57; 429/204; 429/225; 429/129
[58] Field of Search ........................ 429/58, 59, 60, 57, 429/122, 129

[56] References Cited

U.S. PATENT DOCUMENTS

| | | | |
|---|---|---|---|
| 3,076,860 | 2/1963 | Dickfeldt et al. | 429/162 |
| 3,132,971 | 5/1964 | Selis et al. | 429/199 X |
| 3,433,671 | 3/1969 | Scholzel | 429/215 X |

*Primary Examiner*—Anthony Skapars
*Attorney, Agent, or Firm*—Haseltine and Lake

[57] ABSTRACT

A lead storage cell comprises a storage jar, an electrolyte contained in the storage jar, negative and positive electrodes within the electrolyte and respectively having a negative electrode metal or active material and a positive electrode active material which are placed in contact with each other preferably a large-meshed woven or non-woven fabric having resistance to the electrolyte and inserted between the negative and positive electrodes.

1 Claim, 9 Drawing Figures

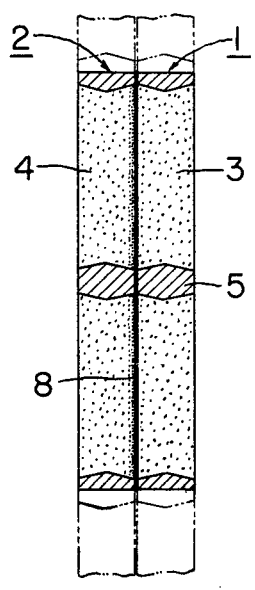
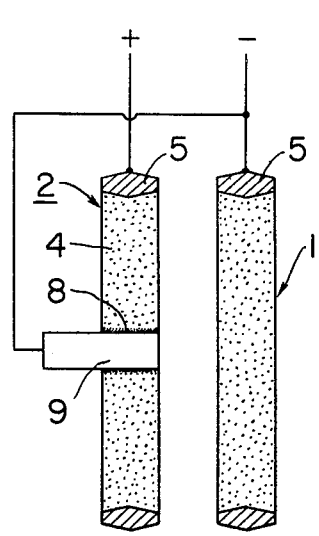
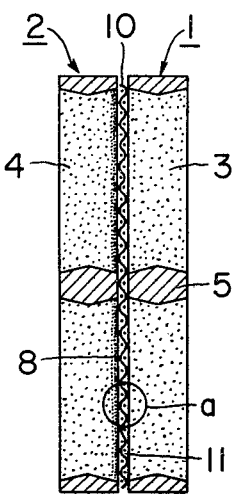
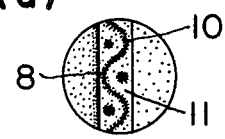
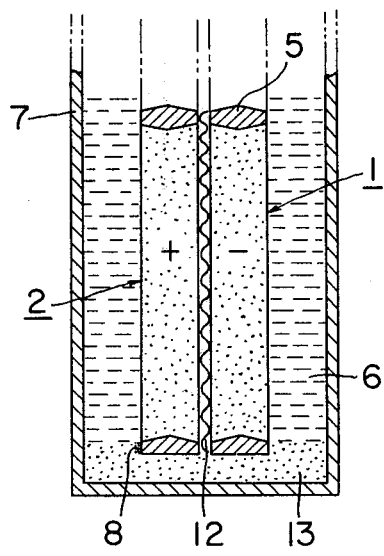
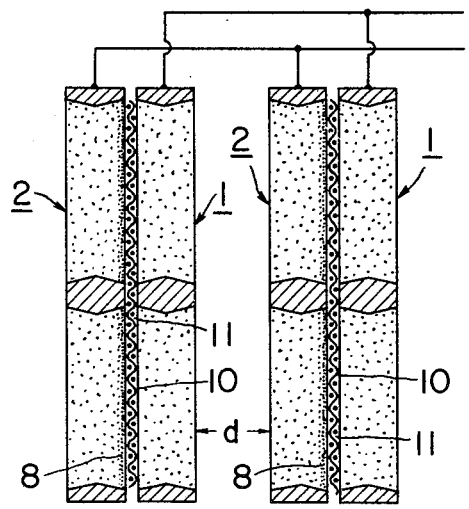

ELECTRIC STORAGE CELL OR BATTERY

This is a continuation of application Ser. No. 905,365 filed May 11, 1978, now abandoned.

BACKGROUND OF THE INVENTION

The present invention relates to an improvement of lead electric storage cells or batteries (hereinafter referred to as storage batteries).

In prior storage batteries, electrolysis of water takes place at the end of recharging or during overcharging which gives rise to evolvement of oxygen and hydrogen gases. When the battery is of an open type, it is always possible for these gases to escape from the battery to the outside. However, when the battery is of a sealed type, various countermeasures to prevent an increase in internal pressure due to the evolvement of these gases and ultimate breakage of the container have been taken such as: the use of a pressure container capable of withstanding and increase in internal pressure due to these gases, the provision of a safety valve operating when the internal pressure is abnormally increased, and chemical transformation of these gases into water by catalysts on the electrode plates.

On one hand, all storage batteries have previously used separators which are made of various microporous materials between the positive electrode plates and the negative electrode plates and are continuously arranged in a row in order to prevent contact short-circuiting between the two electrode plates. Ordinarily, the separator is composed of woody, rubbery, fibrous or synthetic resinous materials. A glass mat may be used. The use of such a separator necessarily adds to the material cost to a significant degree.

SUMMARY OF THE INVENTION

It is an object of the present invention to provide a lead storage battery in which gas evolution during recharging of the storage battery is eliminated or controlled.

The above described object and other objects have been achieved by this invention, which, briefly summarized, provides a lead storage battery comprising a storage jar, an electrolyte contained in the storage jar, negative and positive electrodes immersed within the electrolyte and respectively having a negative electrode metal or active material and a positive electrode active material which are placed in contact with each other and preferably a large-meshed woven or non-woven fabric having resistance to the electrolyte and inserted between the negative and positive electrodes.

BRIEF DESCRIPTION OF THE DRAWING

In the drawing:

FIGS. 1 through 5 are enlarged elevations of the essential parts of examples of storage batteries intended to eliminate or control gas evolution during recharging.

FIG. 1 shows an example wherein the two electrode plates are brought into planar contact with each other to bring the active materials of the two electrodes into contact with each other.

FIG. 2 shows an example wherein a negative metal is inserted into the positive active material and this material is connected to the negative electrode.

FIG. 3 shows an example of the preferred embodiment of the present invention wherein a woven or non-woven fabric is inserted between the two electrodes, and active materials are deposited on the network of the fabric.

FIG. 3(a) is detailed view of the area "a" in FIG. 3.

FIG. 4 shows an example wherein active materials are deposited at the bottom of a prior storage battery, and the two electrodes are caused to be short-circuited.

FIG. 5 shows an example wherein two sets of the electrode plates shown in FIG. 3 are arranged in spaced-apart relation, and FIG. 3(a) shows a further enlarged view of the portion (a) of FIG. 3.

DETAILED DESCRIPTION

The present invention will be described in more detail with reference to the accompanying drawings each of which shows essential parts of an example of a lead storage cell embodying the present invention.

Figure 6:
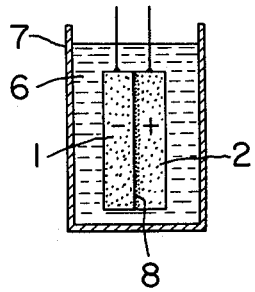
FIG. 6 is a diagrammatic view of a lead storage battery produced by immersing the electrode plates shown in FIG. 1 into an electrolyte within a battery jar and connecting lead lines to the plates.

Referring to FIG. 1, the essential parts of this lead storage cell are a negative electrode plate and a positive electrode plate 1 and 2, the active materials 3 and 4 respectively supported by the negative and positive electrode plates 1 and 2, respectively, and a grid 5 of the two electrode plates. In FIG. 6, these components are shown in an assembled state together with an electrolyte 6 and a battery jar 7. In the electrode plates as shown in FIG. 1, the active materials of the two electrodes contact each other, and the direct contact portion 8 of the positive active material 4 undergoes oxidation and reduction during charging and discharging, thereby to function as a substitute for a separator.

That is, when the battery is being discharged or left as it is, the contact portion is partially subjected to discharge reduction and becomes thereby nonconductive, functioning as a substitute for a separator between the two electrodes. On the other hand, when the battery is being charged, the reduced contact portion 8, serving as a substitute for a separator, is gradually oxidized thereby to restore its electrical conductivity. Thus, as most of the charging current passes through the contact portion 8 via the grid from the positive electrode by by-passing the electrolyte, i.e., by electronic conduction, little electrolysis of water takes place, whereby no gas is produced.

More particularly, if the negative electrode metal or negative active material is brought into direct contact with the positive active material, discharge tends to occur instantaneously, but it stops immediately. When the battery after being charged is changed to an open circuit or discharge circuit, the positive active material undergoes chemical change and, in the case of a lead storage battery, the positive active material $PbO_2$ is transformed into $PbSO_4$. This transformed material is all in the form of a thin electrical insulating film which is nonconductive and thus serves as a substitute for the separator of a conventional storage battery.

As compared with a separator of high electrical resistance used in a conventional storage battery, the thin insulating film results in a remarkably higher discharge efficiency and further functions with great effectiveness during charging because it is a very thin chemical film. More specifically, at the initial stage of charging, little current passes through the nonconductive portion, and in the course of charging, the nonconductive portion is gradually rendered conductive. When charging is almost complete, the nonconductive portion is activated, and, as stated above, a charging current passes from the positive terminal to the grid and the activated portion as a by-pass and then passes from the negative electrode metal or active material to the negative terminal by electronic conduction. As most of the charging currents passes through the activated portion, the terminal voltage between the two electrodes is also low and no substantial electrolysis of water occurs.

In conventional storage batteries, most of the charging current is consumed for electrolysis of water at the end of charging. In contrast, according to the present invention, the charging current which has previously been expended for electrolysis of water is allowed instead to serve as a substitute for a separator as a by-pass circuit. This makes it possible to lower the internal resistance of the battery, to increase the charging current, and to shorten the charging time.

When the positive active material is brought into contact with the negative electrode metal or active material, special attention must be given to the contact resistance in the direct contact portion. The less the resistance, the greater is the advantage of the present invention. In other words, when this battery is charged, a large charging current flows from the terminal to the grid and the direct contact portion of the by-pass circuit, whereby the ratio of charging to the negative and positive electrode plates with respect to the by-pass circuit thereby becomes low which makes charging to the two electrode plates difficult. On the contrary, when the contact resistance is high, the effectiveness of the present invention becomes low. For this reason, it is necessary to maintain a most suitable level of the contact resistance.

One way to fulfill this requirement is to add an additive, such as plastic powders having resistance to an electrolyte, into the positive active material on the facing sides between the negative and positive electrode plates. An alternative way to maintain a most suitable level of the contact resistance is to apply a paint having resistance to phenolic resins or epoxy resins onto the surface of the positive active material on the facing sides mentioned above and to fill the space between the active material crystals on the surface of the positive active material with the paint.

FIG. 2 shows another embodiment of the present invention in which a negative electrode metal 9 is embedded in the positive active material 4 and the metal is connected to the negative electrode plate 1. The contact portion 8 at which the negative electrode metal 9 contacts directly the positive active material 4 is a portion which undergoes oxidation and reduction during charging and discharging.

According to the structure shown in FIGS. 1 and 2, however, where the contact resistance between the negative and positive plates is apt to become too low, and therefore the charging voltage at the termination of charging becomes too low. For example, for a lead storage battery, it is from 2.2 to 2.3 volts per cell, and the discharge capacity tends to be insufficient. As a consequence, the contact resistance must be somewhat increased.

According to the present invention, said disadvantage has been effectively avoided by inserting a large-meshed woven or non-woven fabric 10 having resistance to an electrolyte between the negative and positive electrodes 1 and 2 as shown in FIG. 3. In the case of a lead storage battery, a tetron (polyethylene terephthalate) woven fabric may be used. This woven fabrics may be preferably very thin, for example, about 0.1 mm and two or three sheets are particularly suitable. The reason why the number of sheets of the woven fabric is different as compared with that of the lead storage battery.

When the storage battery assembled as stated above is subjected to two or three cycles of charging and discharging, the active material falls off from the electrode plate, clogging the mesh of the woven fabric inserted between the two electrodes, and the active material 11 in the mesh becomes a resistor. The resistor may be increased or decreased depending upon the number of the sheets of fabric to be inserted. In the drawing, the reference numeral 8 designates a portion wherein the active materials of the two electrodes which have fallen off accumulate on the mesh causing short-circuiting between the negative and positive electrode plates and thereby undergo oxidation and reduction during charging and discharging.

A conventional separator has been provided so as not to permit fine particles of active materials, which have fallen off during charging and discharging, to pass through and accumulate in the micropores of the separator and to cause short-circuiting between the two electrodes. In contrast, in the embodiment of the present invention stated above, a woven or non-woven fabric having resistance to the electrolyte and a relatively rough mesh is inserted between the two electrode plates so that fine particles of active materials which have fallen off during charging and discharging are positively caused to pass through and accumulate in the mesh of the woven or non-woven fabric. This utilizes the accumulated active materials as a resistor, and the contact resistance between the two electrodes can be suitably determined by adjusting the resistance of the resistor. If either of the storage batteries described above is to be produced by using the existing electrode plates, it is preferable to use electrode plates with grids covered by active materials.

In addition, although the lead storage battery requires an electrolyte in a quantity proportionate to the quantity of the active materials of the negative and positive electrode plates, the quantity of the electrolyte present becomes deficient when the negative and positive electrode plates are brought into direct contact with each other.

In the case of the lead storage battery, including only one set of one negative electrode plate and one positive electrode plate in direct contact with each other, there is no need for compensating for the deficient quantity of the electrolyte. However, when several sets of one negative electrode plate and one positive electrode plate are arranged so as to form a group of electrode plates, it is necessary to ensure the required quantity of the electrolyte by enlarging and adjusting the space between the sets. If the two electrode plates are arranged at an interval determined from the required quantity of the electrolyte, and the required quantity of the electrolyte is supplied to the two electrode plates from the rear side of the direct contact portion through the numerous pores of the electrode plates, the battery functions effectively.

FIG. 5 shows an embodiment wherein two sets of the plate group shown in FIG. 3 are arranged parallel to each other an interval of d.

Although the battery construction where the negative electrode metal or active material is in direct contact with the positive electrode active material has been described with reference to FIGS. 1, 2 and 3, similar results can be obtained in accordance with the present invention when these components are brought into indirect contact with each other as shown in FIG. 4. If a positive electrode active material or a negative electrode active material, or a mixture thereof 13 is deposited or attached to the bottom or other portions of a conventional type storage battery containing a separator 12, these active materials will cause a short-circuit between the negative electrode and the positive electrode, by which portion 8 undergoing oxidation and reduction during charging and discharging at the lower portion of the active materials develops. In such a case, the effect as described above can also be expected to some degree. Accordingly, this construction also is within the purview of the present invention.

Figure 7:
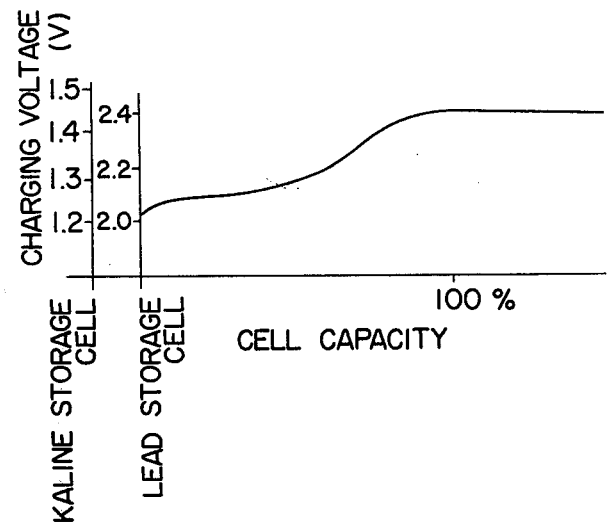
FIG. 7 is a graph indicating the variation of recharging voltage with cell capacity in the lead storage battery shown in FIG. 6.

In the storage battery of the present invention wherein the negative electrode metal or active material is brought into contact either directly or indirectly with the positive electrode active material as illustrated in each of the above described examples, no electrolysis of water occurs during charging and therefore no generation of oxygen and hydrogen gases takes place. This is indicated in FIG. 7 which shows variation in charging voltage with cell capacity when the storage battery shown in FIG. 6 is charged at a two-hour rate. It is apparent from this graph that the charging voltage does not exceed 2.4 V for a lead storage battery even in an overcharged condition. Since the potential of the negative and positive electrodes does not exceed a level at which hydrogen or oxygen evolves, no evolvement of gases due to electrolysis of water is observed even if the battery is overcharged. As a consequence, the discharge efficiency is remarkably high. More specifically, the lead storage battery of the present invention has a discharge efficiency of about 90% at a 1CA discharge, while a conventional lead storage battery has a discharge efficiency of only about 50 to 55%.

Figure 8:
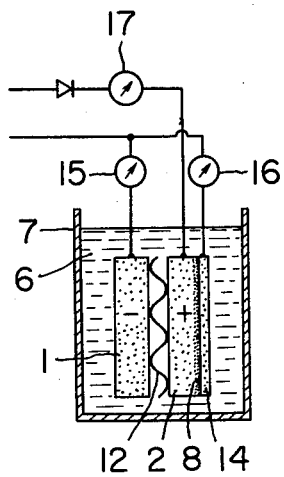
FIG. 8 is a diagrammatic view of a lead storage battery particularly designed for determining the performance of the storage battery of the present invention.

In order to observe the performance of the storage battery according to the present invention, a storage battery as shown in FIG. 8 was made and tested. This storage battery included a negative electrode plate 1, a positive electrode plate 2, and a separator 12 inserted between these plates as in a conventional storage battery. In addition, in the illustrated battery, a metal plate 14 having resistance to the electrolyte and functioning as a negative electrode, i.e., a third electrode was brought into contact with the outside of the positive electrode plate 2. These parts were immersed in an electrolyte 6 in a battery jar 7. Portion 8 undergoing oxidation and reduction developed on the surface of the positive active material. Then, during charging and discharging, the current flowing between the negative and positive electrodes, the current flowing between the third electrode and the positive electrode, and the sum of these currents were measured by means of three ammeters 15, 16 and 7.

Figure 9:
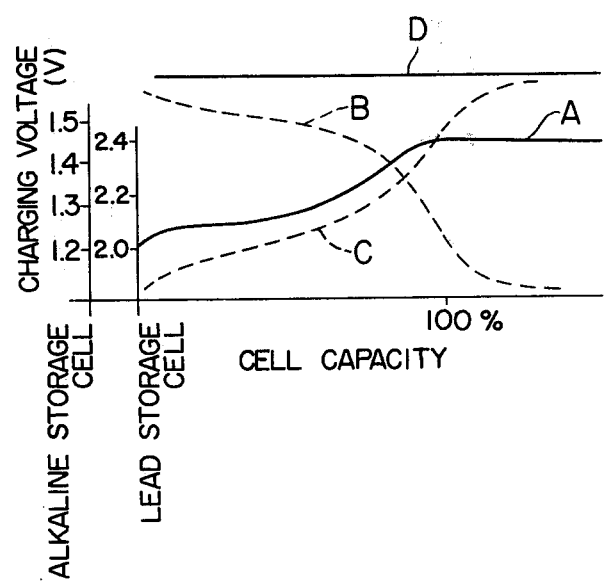
FIG. 9 is a graph illustrating variations of recharging voltage and current with cell capacity in the storage battery shown in FIG. 8.

The charging characteristic of the storage battery shown in FIG. 8 at the time when it is charged at a two-hour rate is shown in FIG. 9. In FIG. 9, the abscissa represents charging capacity and 100% denotes the capacity of the battery. The ordinate represents charging voltage and charging current and the scale indicates only the charging voltage. Curve A shows that the voltage increases as charging proceeds at the charging voltage, but the charging voltage in an overcharged state is slightly less than that in a 100% charged state. Curve B shows the charging current between the negative electrode and positive electrode, which is indicated by ammeter 15. Curve C shows the current passing between the positive electrode and the third electrode, which is indicated by ammeter 16. Curve D shows the sum current of curve B added to curve C, and this current is indicated by ammeter 17.

In curve B, i.e., the current flowing between the negative plate 1 and the positive plate 2, the current flows in a large quantity at the initial stage of charging, but it is greatly reduced as the charging proceeds. This is greatly different from the behavior of the conventional storage battery.

The current flowing between the positive plate 2 and the third electrode 14 which functions as a negative electrode is low at the initial stage of charging and gradually increases as the charging proceeds, as shown by curve C. It is apparent that the positive active material of the contact portion 8 between the positive electrode plate 2 and the third electrode 14, which has been previously reduced, is gradually oxidized. It is rendered electrically conductive as the charging proceeds, whereby the current between the positive electrode plate and the third electrode begins to flow through a by-pass circuit, and the by-passed current is gradually increased.

When the charging circuit is turned off or discharging is immediately started, the positive active material of the contact portion between the positive electrode plate and the previously oxidized third electrode, is reduced and rapidly rendered non-conductive. Since the charging characteristic shown in FIG. 9 is also the same as that shown in FIG. 7, it is apparent that all of the examples of the storage battery embodying the present invention as shown in FIGS. 1 to 5 exhibit excellent charging characteristics. However, in the case of the example shown in FIG. 4, the charging characteristic is the same as that of the conventional storage battery because it uses a conventional separator.

The storage battery of the present invention can use not only a fluid electrolyte, but also a colloidal electrolyte. Further, it is equally effective wwhether it is the sealed type or whether it is the open type.

Thus, in accordance with the present invention, by bringing the negative metal or active material into contact with the positive active material of the storage battery without actual use of a separator, it is possible to remarkably increase the charging efficiency without causing water to be electrolyzed, thus without causing oxygen and hydrogen gases to be evolved at the end of charging and during overcharging. It is further possible to cut down the material cost. Accordingly, the present invention provides a storage battery of high utility.

What I claim is:

1. A lead storage battery of a large type which comprises a storage jar, an electrolyte consisting of dilute sulfuric acid and contained in said storage jar, and negative and positive electrodes immersed within said electrolyte, said negative electrode comprising a negative electrode metal or a negative electrode active material and said positive electrode comprising a positive electrode active material, and said negative electrode metal or negative electrode active material being placed in direct contact with said positive electrode active material, said contact portion comprising a chemical insulating layer formed at said contact portion by subjecting to reduction and oxidation by discharging and charging through said contact portion whereby short-circuiting caused by direct contact is avoided and wherein a large-meshed woven or non-woven fabric having resistance to the electrolyte is inserted between the negative and positive electrodes.

* * * * *